3,322,661
GRAFT COPOLYMERIZATION OF A VINYL MONOMER ONTO A POLYOLEFIN WITH IRRADIATION IN THE PRESENCE OF OXYGEN AND A REDUCING AGENT
Etsuro Yoshikawa and Takashi Morita, Yokohama, Japan, assignors to Chisso Corporation, a corporation of Japan
No Drawing. Filed Sept. 16, 1963, Ser. No. 309,312
Claims priority, application Japan, Sept. 18, 1962, 37/40,467
7 Claims. (Cl. 204—159.17)

This invention relates to novel methods for producing graft-copolymers of olefin homopolymer or copolymer (for the purpose of simplicity hereinafter they will be described as polymers) having tertiary carbon atoms. More specifically it relates to graft-copolymerization with one or more of vinyl compounds, which are polymerizable by free radical mechanism, onto olefin polymers having hydroperoxy radicals in the presence of a solvent or a mixture of solvents for vinyl compounds, water and a reducing agent.

An object of this invention is to provide methods for graft-copolymerization which are useful even in the presence of molecular-oxygen-containing gas, in contrast to conventional methods which necessitate the absence of oxygen. Another object of this invention is to provide methods which enables to graft-copolymerize at a usual temperature with a speed much faster than any of the conventional methods. Still more objects of this invention is to provide methods which can be performed at a temperature lower than 30° C. thereby to prevent deleterious effect of temperature to the crystal of olefin polymers, and to prevent the formation of undesirable homopolymer of vinyl compounds.

It is well known that graft-copolymers can be obtained by grafting radically polymerizable unsaturated organic compounds to saturated polymer having hydroperoxy radical on their trunk or on their side chains. In this case it has been the utmost important factor to effect graft-copolymerization in the absence of molecular oxygen. However, all these methods have had many defects, not only in the point that they require troublesome operation for eliminating oxygen from reaction system, but also in the point that relatively higher reaction temperature is needed to effect graft-copolymerization with commercially feasible reaction velocity and such a high reaction temperature inevitably causes deformation of crystal of olefin polymers, simultaneously accompanying undesirable side reaction of vinyl homopolymer formation.

After extensive study of graft-copolymerization of this kind, we have now found that such disadvantages of conventional graft-copolymerization as described above can be wonderfully eliminated by use of a reducing agent belonging to lower valent compounds of polyvalent metals. Namely after hydroperoxidizing polyolefin having tertiary carbon atoms by the irradiation of ultraviolet ray in the presence of a light sensitizer and in the presence of molecular oxygen, the resulting polymer is contacted with a monomeric vinyl compound, its solvent, water and a reducing agent of lower valent compounds of polyvalent metals in the presence of oxygen by which, graft-copolymerization is found to proceed with excellent speed and with high yield. When the reducing agent of lower valent compounds of polyvalent metals is used, the reaction of graft-copolymerization is greatly enhanced even in the presence of oxygen or air, by the formation of a redox system between hydroperoxy radical of the hydroperoxidized polymers and the reducing agent. Moreover, when the graft-copolymerization is conducted at a usual temperature of 30°–120° C., reaction is completed within an extremely short time, and even when the graft-copolymerization is conducted at a temperature lower than 30° C., the reaction velocity is still more than 10 times as fast as the conventional graft-copolymerization. At the same time the formation of vinyl homopolymer due to elevated temperature and deformation of crystal of trunk polymer can be prevented wonderfully. Above comparison with the conventional methods will be explained by taking up one of the embodiments of the present method. Hydroperoxidized polypropylene fiber obtained by irradiating with ultraviolet rays from sterilizing lamps for one minute in the air at room temperature was immersed in a mixed solution of methylethylketone, dioxane and water containing 20 percent of glycidyl methacrylate and $2 \times 10^{-3}$ mol/l. of ferrous sulfate, at a temperature of 30° C. for 23 hours. 11 percent increase of weight was observed due to graft-copolymerization in this case. On the other hand when the ferrous sulfate was not used, observed weight-increase due to graft-copolymerization was less than one percent.

In order to introduce hydroperoxy radicals to olefin polymers, there are known several methods such as (a) irradiation of ultraviolet rays, (b) irradiation of radioactive rays, (c) heating, etc. All these methods are carried out in the presence of oxygen containing gas and can be applied to the methods of this invention. However the method (a) is most preferred because secondary effects such as abscission of the principal chains, i.e. reduction of molecular weight, or damage of crystal, or cross-linking etc., do not happen in the method (a). In the method (a) the presence of a light sensitizer such as benzophenone, 4-chloro-benzophenone 4,4′-dimethylbenzophenone, benzaldehyde acetophenone, dibenzyldisulfide, diphenylamine desoxybenzoin, etc., in an amount about 0.1–1 percent vs. olefin polymers is preferable.

These light sensitizers are dissolved in a suitable solvent such as methanol, ethanol, ether, chloroform, benzene, toluene, xylene, dioxane, tetrahydrofurane, water, etc., or a mixture of these solvents. Polyolefins to be graft-copolymerized, whether they are in a powder form, in a fiber form or other shaped article, are immersed in above-mentioned solution, or above-mentioned solution is spread on the surface of the shaped articles of polyolefin uniformly e.g. by spraying, or sensitizers are mixed uniformly with polyolefin prior to fabrication into fibers or plastic masses. Fibers or plastic masses incorporated uniformly on their surface or in the interior with a sensitizer undergo hydroperoxidizing reaction by irradiation of ultraviolet light in the presence of oxygen or air.

Irradiation condition of ultraviolet light must be suitably selected according to the degree of hydroperoxidation, but when mercuric lamps of moderate capacity are used, irradiation time will be sufficient for 0.1–60 minutes.

Hydroperoxidized polyolefins are brought into reaction with monomeric vinyl compounds and their solvents in a polymerizer. By incorporating with a little amount of lower valent salt of multivalent metal as a reducing agent, in this instance, the graft-copolymerization proceeds rapidly at a temperature lower than 120° C. even without previous deoxygenation treatment. As such reducing agents of lower valent salt of multivalent metal, ferrous sulfate, ferrous ammonium sulfate, cuprous chloride, mercurous chloride, cerous nitrate, cerous ammonium nitrate, chromous chloride, low valent cobalt chloride, etc. are useful. They are used in the polymerizer at a concentration from about $10^{-7}$ mol/l. to $10^{-1}$ mol/l.

As monomeric vinyl compounds useful in the present graft-copolymerization, such compounds as vinyl acetate, esters of methacrylic acid, ester of acrylic acid, acrylonitrile, styrene, vinylpyrrolidone, vinyl pyridine, etc., and compounds having epoxy radicals such as glycidyl methacrylate, glycidyl acrylate, glycidyl vinyl urethane, etc. are cited. A mixture of the foregoing compounds are also useful. As solvents for such monomeric vinyl compounds, acetone, methylethylketone, dioxane, tetrahydrofurane, cyclohexane, cyclohexanone, toluene, xylene, tetralin, methanol, ethanol, butanol, ethylether, etc., and a mixture of these compounds are also useful. Monomeric vinyl compounds are used as a solution in the foregoing solvent at a concentration of 5–90 percent.

The reactions caused by the present invention are illustrated by following formulas, in case of polypropylene, glycidyl methacrylate and ferrous ion.

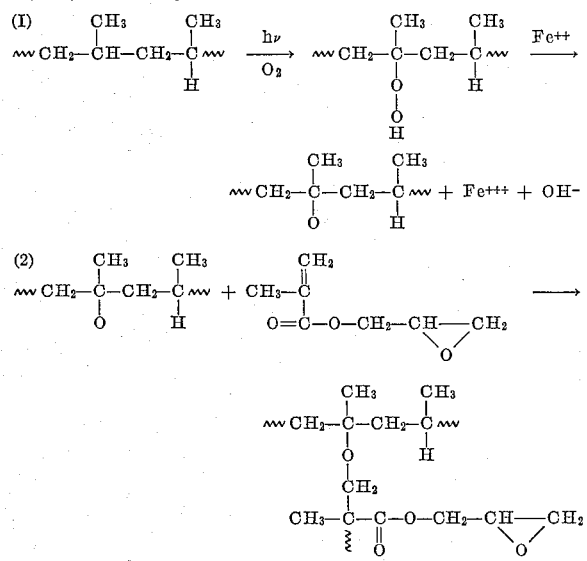

When graft-copolymers of polyolefin containing epoxy radical which are produced by the method of present invention, are treated with an aqueous solution of oxyamines, various amino acid, salts of the amino acids, salts of β-aminoethyl sulfonic or sulfinic acids, or the foregoing aqueous solution containing a small amount of dimethyl formamide, thereby to introduce hydrophilic radicals by addition reaction of these compounds with epoxy radical, dyeability or printability of these graft-copolymers can be greatly improved. When such compounds as 2,6-bis{(2′-hydroxy-3′-tertiary-butyl-5′-methyl)-benzy} - 4 - methylphenol, 4-tertiary-butyl-phenylsulcylic acid, 2 - hydroxybenzophenone, 3,3′-thio-dipropionic acid monoester, hydrogen sulfide and the like are reacted solely or in a mixture of these, with the epoxidized graft-copolymers of the present invention, resistance to weathering can be improved remarkably without any deleterious effect on their transparency.

The invention will be illustrated in greater detail by description in conection with the following specific examples of the practice of it, percent here and elsewhere herein being expressed percent by weight.

*Example 1*

Polypropylene film having 1/1000 in. thickness was treated by 0.3 percent acetone solution of benzophenone under reflux and dried. The resulting film contained about 0.2 percent benzophenone. After irradiation with ultra violet ray from ten, 15 watt sterilizing lamps (10 cm. apart from the film) in the air at room temperature for one minute, this film was heated in a polymerizing vessel together with a mixed solution containing 20 percent glycidyl methacrylate, 35% methyl ethyl ketone, 35 percent dioxane, 10 percent water and $2\times10^{-3}$ mol/l. ferrous sulphate, in the presence of air, at a temperature of 75° C. for 4 hours. After extracting unpolymerized monomer and homo polymer of glycidyl methacrylate by acetone, it was found by weight increase that 64.91 percent of glycidyl methacrylate had been graft-copolymerized. When ferrous sulphate was not added in the above procedure the amount of graft-copolymerized glycidyl methacrylate was only 8.58 percent.

*Example 2*

The same sample of film was treated by 0.3 percent acetone solution of acetophenone under reflux for 2 hours and irradiated with ultraviolet light from ten, 15 watt sterilizing lamps placed at a distance 10 cm. apart for 30 sec. After heating with a solution containing 20 percent glycidyl methacrylate, 35 percent methyl ethyl ketone, 35 percent dioxane 10 percent water and $6\times10^{-5}$ mol/l. cerous nitrate at a temperature of 75° C. for 4 hours in the air, it was found by weight increase that 16.53 percent glycidyl methacrylate had been graft-copolymerized.

*Example 3*

5 denier polypropylene monofilament was treated by benzophenone as in Example 1 and irradiated with ultraviolet light from ten, 15 watt sterilizing lamps placed at the distance 10 cm. apart for 30 seconds in the air of room temperature. Then the monofilament was heated together with mixed solution containing 20 percent glycidyl methacrylate, 70 percent cyclohexanone, 10 percent water and $2\times10^{-3}$ mol/l. ferrous sulfate in the air at 75° C. for 4 hours. It was found by weight increase that 14.77 percent glycidyl methacrylate had been graft-copolymerized.

*Example 4*

The same sample of film as in Example 1 was treated in benzophenone and allowed to stand for 2 days under the scattered sunlight. Then the film was placed in a mixed solution containing 20 percent methyl methacrylate, 35 percent methyl ethyl ketone, 35 percent dioxane, 10 percent water and $2\times10^{-3}$ mol/l. ferrous sulfate at a temperature of 30° C. for 10 hours. It was found that 30 percent of methyl methacrylate had been graft-copolymerized.

*Example 5*

The same sample of film was treated by benzophenone as in Example 1, and subjected to the irradiation of ultraviolet light from ten, 10 watt sterilizing lamps placed at the distance 10 cm. apart in the air at room temperature for one minute. Then the film is allowed to stand in the presence of air at 30° C. for 23 hours together with a mixed solution containing 20 percent glycidyl acrylate, 35 percent methyl ethyl ketone, 35 percent dioxane, 10 percent water and $2\times10^{-3}$ mol/l. ferrous sulfate, by which 10.87 percent glycidyl acrylate was found to have been graft-copolymerized.

*Example 6*

Polybutene immersed in 0.3 percent acetone solution of benzophenone and dried, was irradiated with ultraviolet light from ten, 15 watt sterilizing lamps placed at the distance of 10 cm. apart for 30 minutes. It was then heated in a mixed solution containing 20 percent methyl methacrylate, 70 percent tetrahydrofurane, 10 percent water and $2\times10^{-3}$ mol/l. ferrous sulphate, in the presence of air, at a temperature of 45° C., for 10 hours, by which 85.08 percent methyl methacrylate was found to have been graft-copolymerized.

*Example 7*

A sample of film of ethylene-propylene copolymer having 50 microns of thickness, 2.49 of 43.6 percent ethylene and 56.4 percent propylene was hydroperoxidized as in Example 6, and heated in a mixed solution containing 20 percent methyl methacrylate, 70 percent dioxane, 10 percent water and $6\times10^{-5}$ mol/l. cerous nitrate, without driving oxygen off, at a temperature of 75° C., for 4 hours, by which 33.06 percent of methyl methacrylate was found to have been graft-copolymerized.

What we claim is:

1. A method for producing a graft copolymer from a homopolymer or copolymer of an olefin having a tertiary carbon atom which comprises;
   (1) radiating said olefin in the presence of an oxygen-containing gas, a hydroperoxide, and a light sensitizer, and
   (2) contacting the same with a vinyl monomer in the presence of an oxygen containing gas, a solvent, water, and a reducing agent selected from the group consisting of ferrous sulfate, ferrous ammonium sulfate, cuprous chloride, cerous nitrate, cerous ammonium nitrate, chromous chloride, and low valent cobalt chloride.

2. A method for producing a graft-copolymer from a homopolymer or copolymer of an alpha mono-olefin which comprises
   (1) radiating said mono-olefin in the presence of an oxygen-containing gas, a hydroperoxide and a light sensitizer, and
   (2) contacting the same at a temperature of about 30° to 120° C. with a vinyl monomer in the presence of an oxygen-containing gas, a solvent, water, and a reducing agent selected from the group consisting of ferrous sulfate, ferrous ammonium sulfate, cuprous chloride, cerous nitrate, cerous ammonium nitrate, chromous chloride, and low valent cobalt chloride.

3. The method of claim 2, wherein the alpha mono-olefin is selected from the group consisting of polypropylene, polybutene, and ethylene-propylene copolymer.

4. The method of claim 2, wherein the graft-copolymerization is conducted at a temperature of less than about 30° C.

5. A method for producing a graft-copolymer from a homopolymer or copolymer of an olefin selected from the group consisting of polypropylene, polybutene, and ethylene-propylene copolymer which comprises
   (1) irradiating said olefin in the presence of an oxygen-containing gas, a hydroperoxide, and a light sensitizer, and
   (2) contacting the same with a vinyl monomer in the presence of an oxygen-containing gas, a solvent, water, and a reducing agent selected from the group consisting of ferrous sulfate and cerous nitrate.

6. The method of claim 5, wherein the graft-copolymerization is conducted at a temperature of about 30° to 120° C.

7. The method of claim 5, wherein the graft-copolymerization is conducted at a temperature of less than about 30° C.

References Cited

UNITED STATES PATENTS 3,008,920   11/1961   Urchick _____ 204—159.17

MURRAY TILLMAN, *Primary Examiner.*

D. J. BREZNER, *Assistant Examiner.*